United States Patent [19]
Espenschied

[11] 4,226,141
[45] Oct. 7, 1980

[54] AUTOMATIC TRANSMISSION GEAR CHANGE SHOCK REDUCTION SYSTEM PARTICULARLY FOR AUTOMOTIVE DRIVE TRAINS

[75] Inventor: Helmut Espenschied, Ludwigsburg, Fed. Rep. of Germany

[73] Assignee: Robert Bosch GmbH, Stuttgart, Fed. Rep. of Germany

[21] Appl. No.: 902,420

[22] Filed: May 3, 1978

[30] Foreign Application Priority Data

Jun. 10, 1977 [DE] Fed. Rep. of Germany ....... 2726377

[51] Int. Cl.³ ........................ B60K 15/00; B60K 20/16

[52] U.S. Cl. ........................................ 74/858; 74/859; 74/860

[58] Field of Search .................. 74/857, 858, 859, 860

[56] References Cited

U.S. PATENT DOCUMENTS

| | | | |
|---|---|---|---|
| 2,737,059 | 3/1956 | Perkins | 74/859 |
| 3,433,101 | 3/1969 | Scholl et al. | 74/866 |
| 3,667,577 | 6/1972 | Weymann | 74/858 X |
| 3,763,720 | 10/1973 | Aono et al. | 74/857 |
| 3,814,224 | 6/1974 | Podssuweit et al. | 74/858 X |
| 3,939,738 | 2/1976 | Adey et al. | 74/859 |

FOREIGN PATENT DOCUMENTS

| | | | |
|---|---|---|---|
| 1455872 | 3/1970 | Fed. Rep. of Germany . | |
| 2022768 | 11/1970 | Fed. Rep. of Germany | 74/860 |
| 1812931 | 6/1978 | Fed. Rep. of Germany | 74/859 |

*Primary Examiner*—Leslie Braun
*Attorney, Agent, or Firm*—Frishauf, Holtz, Goodman & Woodward

[57] ABSTRACT

A control unit senses when a gear change command signal is generated and thereupon interrupts the supply of fuel to the engine for a predetermined time, for example about 100 milliseconds. Upon down-shifting, the interruption of fuel supply is delayed to permit the engine to accelerate, thereby simulating double clutching the engine. Fuel supply is interrupted by interrupting injection pulses to an electronic fuel injection system or, if the engine is carburetor-equipped, by supplying air to a bypass connected to the carburetor.

2 Claims, 3 Drawing Figures

AUTOMATIC TRANSMISSION GEAR CHANGE SHOCK REDUCTION SYSTEM PARTICULARLY FOR AUTOMOTIVE DRIVE TRAINS

REFERENCE TO RELATED APPLICATIONS AND PATENTS

U.S. Ser. No. 900,232, filed Apr. 26, 1978, SIEBER et al (claiming priority of German Application No. P 27 21 134.3);

French Pat. No. 1 398 895;

German DE-OS No. 2 046 381;

British Pat. No. 1 466 867;

Cross References to Applications and Patent Related to Gear Shift Control Systems, Assigned to the Assignee of this Application U.S. Ser. No. 882,138, filed Feb. 28, 1978, SAUER et al;

U.S. Ser. No. 867,307, filed Jan. 6, 1978, REMBOLD et al;

U.S. Ser. No. 407,975, filed Nov. 11, 1964;

U.S. Ser. No. 883,873, filed Mar. 6, 1978, REMBOLD et al;

U.S. Ser. No. 867,332, filed Jan. 6, 1978, RABUS et al;

U.S. Pat. No. 3,433,101.

The present invention relates to a system and a method to reduce shifting shock in drive train systems including an internal combustion engine and an automatic transmission, and more particularly to reduce shifting shocks in automotive automatic drive trains.

BACKGROUND AND PRIOR ART

It has previously been proposed to control fuel supply to an internal combustion engine when gear change is to be initiated. This, of course, is done by an experienced driver almost automatically. It is more difficult to simulate driver reaction and action upon gear change by automatic means. For example, French Pat. No. 1 398 895 (=German DE-AS No. 14 55 872) discloses use of an additional throttle in the induction pipe of an Otto-type automotive internal combustion engine and to control such a throttle in dependence on the synchronization state of a transmission. U.S. Pat. No. 3,814,224, to which German Disclosure Document DE-OS No. 2 046 381 corresponds shows an arrangement to control fuel supply in dependence on the switching state of a step transmission in which a fuel supply control element is commanded to operate in dependence on the filling state or hydraulic pressure state of switching clutches or brake bands of an automatic transmission. These arrangements both have the disadvantage that control of the mixture of fuel and air is comparatively complex and, additionally, mechanical feedback to the position of the accelerator pedal is noticed by the operator, which is disagreeable to the operator and interferes with proper and effective control of the vehicle. U.S. Pat. No. 3,939,738, to which British Pat. No. 1,466,867 corresponds discloses an arrangement to control an electronic fuel injection system in which the fuel injection pump receives a control signal not only dependent on operating parameters of the engine, such as engine speed, throttle position, throughput of a fuel pressure pump and the like, but additionally a gear change control signal. This arrangement introduces complexity into an electronic system, which is disadvantageous and may introduce sources of error or malfunction.

THE INVENTION

It is an object to provide a system to reduce switching shock in drive train systems, more particularly in automotive drive train systems in which an internal combustion engine is coupled to an automatic transmission which is simple, yet effective, and which, preferably, has the additional advantage of being capable of addition to already designed or constructed systems without essential modification thereof.

Briefly, an electronic control unit senses whether a gear change command signal is present and, if so, provides an output control system to inhibit fuel supply to the engine. If the engine system is equipped with a carburetor, a simple air bypass valve is connected to the carburetor system which can be easily electrically controlled by the control unit, for example by ON-OFF signals. The bypass can be so arranged that, when controlled to inhibit fuel supply, vacuum in the carburetor is broken by bypassing the carburetor to the induction pipe upstream of the Venturi thereof. If the engine is equipped with a fuel injection system, then the control unit can provide inhibition signals to the fuel injection valves to merely prevent their opening. Preferably, and in accordance with a feature of the invention, the control unit senses whether upshift or downshift command signals are present. If downshift command signals are present, for example to change from third to second gear, interruption of fuel supply is delayed to permit the engine to accelerate during at least a portion of the time that the drive train system is, effectively, in neutral position, thereby simulating a "double clutching" operation. The system interrupts fuel supply for a predetermined time interval, for example under control of a timing stage which, for a typical automotive vehicle, can be in the order of about 100 milliseconds.

The system and method has the advantage that control of fuel supply is simple and thus the torque developed by the engine can be easily controlled; interruption of fuel supply for a predetermined time interval thus provides for effective torque control of the engine. Introducing a time delay in the interruption of fuel supply upon down-shifting, while not introducing a time delay upon up-shifting, is a preferred form of the invention. While various arrangements can be made to interrupt fuel supply in a carburetor-equipped engine system, provision of a controlled air bypass is a particularly simple and hence preferred form of the invention.

Drawings, illustrating preferred examples, wherein.

The invention will be described in connection with an automotive-type internal combustion engine and automatic transmission combination, which is generally referred to as an automotive drive train. When changing gears in such drive trains, an increase in torque occurs during the gear change operation which causes a transmission change shock. This shock is disagreeable to the passengers and to the operator of an automotive vehicle and, additionally, undesirable affects and loads the components of the drive train, as well as additional components which are coupled thereto, such as universal joints, differentials, wheels and tires. It is therefore desirable to reduce the torque delivered by the engine during gear changing. By reducing the torque from the engine during the gear change operation, it is possible to improve the overall quality of operation of the vehicle, and particularly the quality of gear change in the vehicle while simultaneously protecting the clutch elements or brake bands of automatic transmissions. Sudden shocks and impact overloads of components of the drive train can thereby be avoided, or at least reduced to such an extent that they will no longer undesirably affect operation of the vehicle or the structure of its components. Various systems to control switching shock have been proposed, for example by utilizing hydraulic damping effects. In one such system, nozzles and hydraulic chokes or the like are introduced in the hydraulic control circuits. It has also been proposed to mechanically control the engagement rate of mechanical clutch or brake and friction elements included in the transmission.

In accordance with the present invention, it has been found that it is possible to reduce the switching shock by decreasing or entirely interrupting fuel supply to the engine during the gear change operation to thereby reduce the torque supplied by the engine, which is a much simpler solution to decrease switching shock than intervention or interference in the mechanical or hydraulic elements of a transmission.

Figure 1:
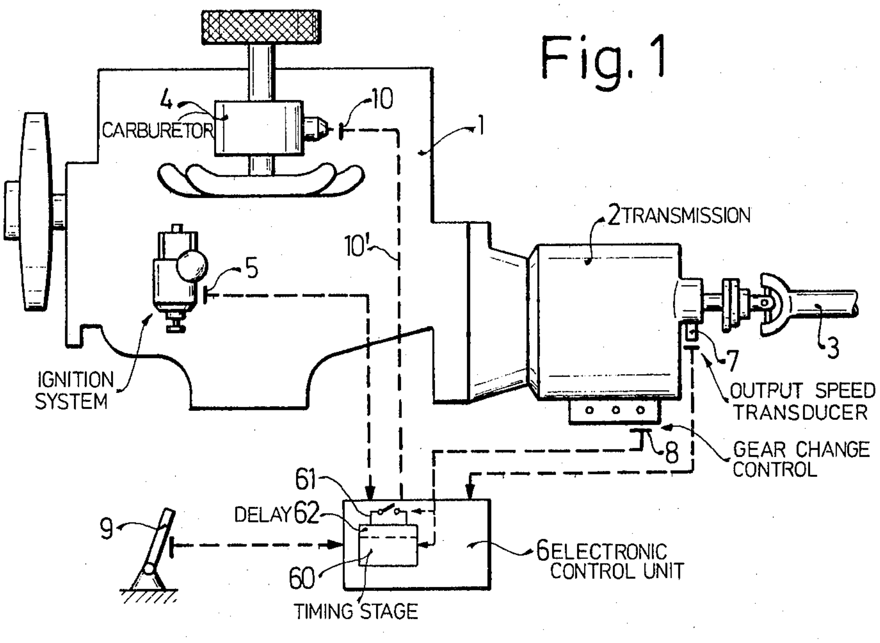
FIG. 1 is a general schematic diagram of the system in combination with an automotive-type engine and automatic transmission.

An external ignition internal combustion (IC) engine 1, of the automotive type (FIG. 1), is connected to a step gear transmission 2 which, in turn, is connected to an output shaft 3 coupled, for example, to the differential of an automotive vehicle through a universal joint and a drive shaft. The engine 1 has a controlled carburetor 4, which will be described in detail below, and an ignition system 5, both of which are connected to an electronic control unit 6. The electronic control unit 6 is connected to a transmission output speed transducer 7, to a gear change control element 8, and to an accelerator pedal 9, which provides signals representative of the position of the accelerator pedal through a suitable transducer, not shown. The electronic control unit is additionally connected over a line 10' to the control input 10 of the carburetor 4.

The electronic control unit 6 is, for example, an electronic gear change control unit of known type. It provides gear change control signals in dependence on various operating parameters of the load system or the vehicle with which the drive train system is used. Typical input parameters are the accelerator position, engine speed, which can be derived from signals from the ignition system, and transmission output speed, derived from transducer 7. The control unit 6 then prepares suitable gear change control signals based on the operating and operation parameters of the engine in accordance with operating characteristics of the drive train system, and furnishes gear change control signals to the gear change control unit 8. These gear change control signals, customarily, are electrical pulses which selectively energize magnetic valves which, in turn, cause operation of mechanical friction elements in a planetary gear system by hydraulic force. The friction elements or brake bands or the like selectively connect the output shaft 3 to the output shaft of the engine or interrupt such connection in which case the transmission is in "neutral".

In accordance with the present invention, the control unit 6 includes a timing stage 60 which provides an inhibition signal on line 10' when a gear change control signal is sensed. In accordance with the embodiment of FIG. 1, the line 10' is connected to the control input 10 of a control carburetor to inhibit or at least greatly reduce fuel supply to the engine. Sufficient fuel may continue to be supplied to permit operation of the engine under "idle" speed conditions. The duration of interruption is controlled by the timing setting of the timing stage 60 and, for example, is in the order of about 100 milliseconds. It has been found from experience that such short interruption of fuel supply is sufficient to prevent sudden engagement of the clutching or brake elements in an automatic transmission 2. It is, of course, possible to interrupt the fuel supply for a longer period of time, although substantially longer interruptions will reduce the tractive effort applied to the wheels so that a reduction in driving power may result. Synchronization of the transmission 2 is facilitated by interrupting fuel supply simultaneously with sensing of an upshift gear change signal if the transmission is changed from a lower to a higher gear, for example from first to second, or second to third gear, etc. If, however, the gear change is in a down-shift direction, it is preferred to delay inhibition of fuel supply. To this end, a delay circuit 62 is coupled to the timing stage which can be short-circuited by a switch 61. When an up-shift signal is sensed, switch 61 is closed, thus interrupting introduction of delay; upon sensing of a down-shift signal, switch 61 is opened, thus introducing a delay to permit acceleration of the engine as the transmission shifts into "neutral", thus simulating a "double clutching" effect. Electronic control unit 6 which controls gear shifting already provides differential criteria for up-shifting or down-shifting, respectively, so that the respective control signal on line 10' can readily be applied either directly, that is, without time delay, or through the delay stage 62 upon down-shifting. A suitable delay time for a four-cylinder automotive-type IC engine of 100 HP is about 100 milliseconds.

Figure 2:
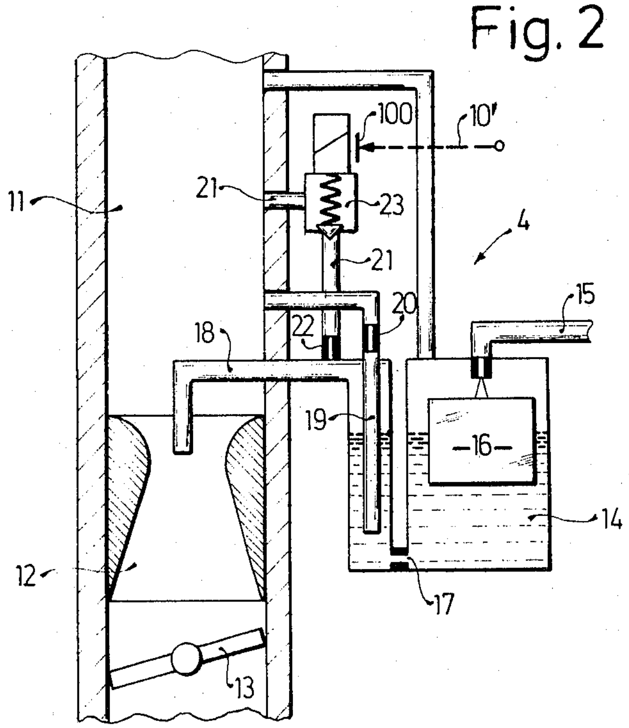
FIG. 2 is a highly schematic carburetor-controlled fuel supply system for the engine of FIG. 1.

A controllable carburetor for use in the system is illustrated in FIG. 2. The carburetor 4, which is illustrated only highly schematically and which shows only the necessary parts for an understanding of the present invention, includes an air induction pipe 11 and a Venturi 12. The throttle 13 is located downstream of the Venturi. A float chamber 14 is supplied with fuel from a fuel supply line 15. Float 16 controls the supply of fuel to the float chamber 14, in known manner. Fuel is supplied through a main nozzle opening 17 and then through fuel outlet line 18 to the Venturi. A mixing tube 19 extends into the fuel line 18. An air correction nozzle 20 is included in the mixing line 19 which is connected to the induction pipe 11 upstream of the Venturi. In accordance with the invention, a bypass 21 is connected to the portion of the fuel exit line 18 which, in quiescent condition, is normally empty of fuel. The bypass 21 also includes an air nozzle or choke 22. The bypass 21 can be opened or closed by means of a magnetic valve 23 which is selectively energized by a solenoid 100, controlled from line 10'.

In ordinary operation, carburetor 4 operates in the same way as any commercial well-known carburetor. Due to the suction of the pistons of the IC engine, air is sucked through the induction pipe 11 and fuel is sucked through the tube 18 as the air passes through the Venturi 12. Under this, normal operation, valve 23 is closed.

If fuel supply is to be interrupted, the valve 23 is opened, thereby bypassing air from the induction pipe 11 to the fuel supply line 18. This breaks the suction effect on the main nozzle 17 and fuel supply from the float chamber 14 to the engine is interrupted. Thus, by selectively energizing line 10' under control of the electronic control unit 6, fuel is selectively interrupted and thus torque supplied from the IC engine 1 is reduced. The control unit 10, therefore, reduced torque during the shifting operation of the transmission 2.

Figure 3:
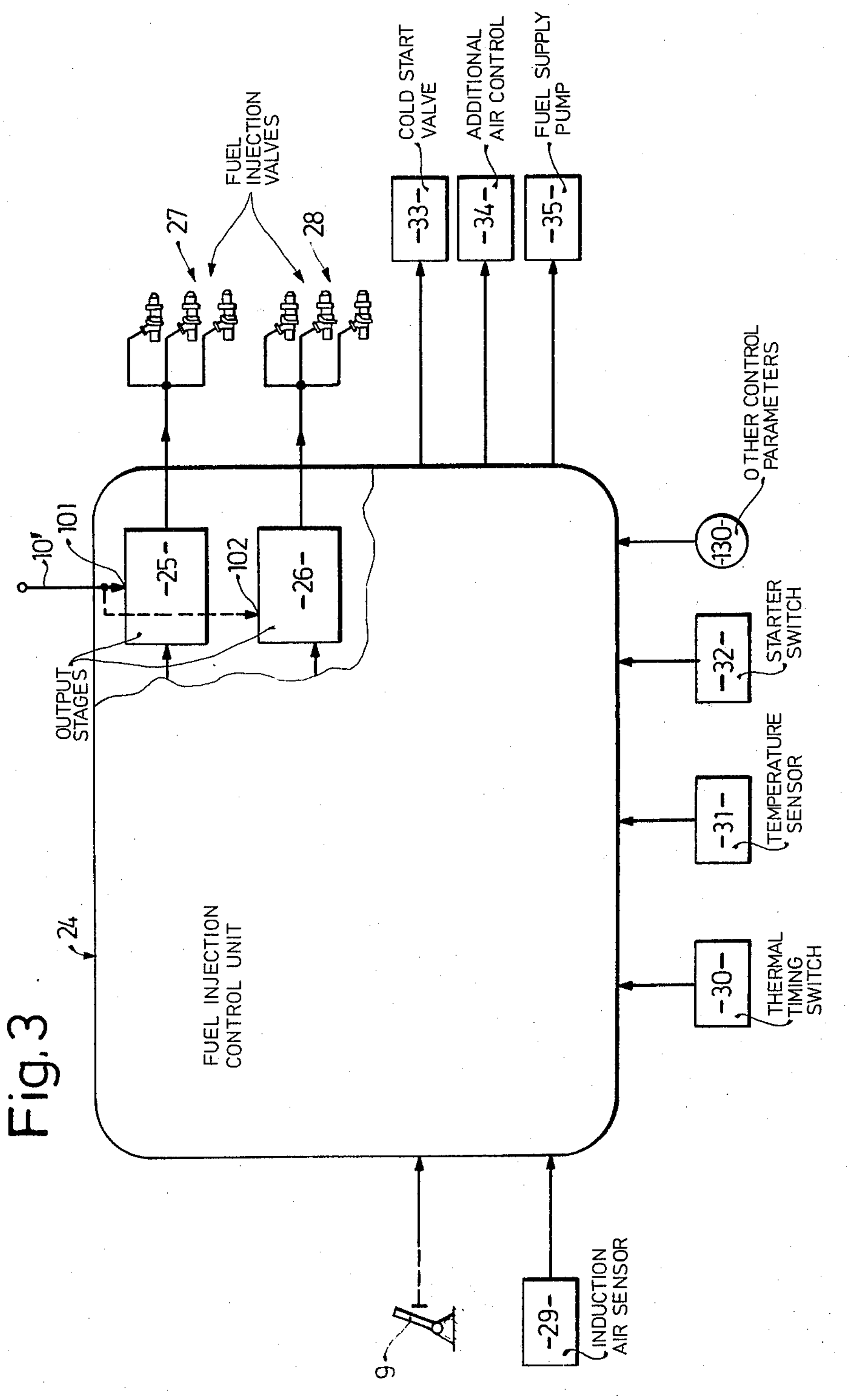
FIG. 3 is a highly schematic fuel injection system illustrating especially those components affected by introduction of the concepts of the present invention.

The system is equally applicable to IC engines in which fuel is supplied from fuel injection systems. FIG. 3 shows, in highly schematic form, a fuel injection control unit 24 of known type which has output stages 25, 26 to control groups of fuel injection valves 27, 28 located in the intake manifold to an IC engine, as shown distributed, for example, for a 6-cylinder engine. The fuel injection control unit 24 has inputs which are derived from the position of the accelerator or operator controlled pedal 9, an air induction sensor 29, sensing the mass flow of air to the engine; and additional inputs to control the injection time based on engine operation or operating parameters, or on environmental conditions, such as a thermal timing switch 30, an ambient or engine temperature sensor 31, a starter switch connection 32 to change the fuel injection time if the engine is under starting condition, and other engine operating parameters generally transduced by suitable transducers 130, for example composition of exhaust gases. The fuel injection control unit 24 additionally provides outputs to a cold start valve 33 to supply additional fuel, an additional air control unit 34, and to a fuel supply pump 35. Such fuel injection control units are known and are in commercial use. In accordance with the present invention, the fuel injection valves 27, 28 are additionally controlled from line 10'; as shown, and in a simple mode of operation, the output stages 25, 26 have additional inputs 101, 102, respectively, which inhibit operation of the respective output stages, thus blocking fuel supply from the fuel injection valves 27, 28 if line 10' is appropriately controlled. Thus, application of a control signal to line 10' from the control unit 6 provides an inhibit to the control inputs 101, 102 and thus inhibits supply of fuel from the injection valves 27, 28 to the IC engine 1, thereby reducing torque from the engine during gear changing of the transmission 2.

The momentary, short-time interruption of fuel supply to the IC engine 1 decreases the slipping of the frictional elements in the automatic transmission and promotes more rapid gripping thereof, thus decreasing hysteresis of gear change engagement and increasing the frictional coefficient and adhesion of frictional elements, clutch elements or brake bands in the automatic transmission. As can readily be seen from a consideration of FIGS. 1 to 3, reduction in torque during gear changing can be achieved in existing automotive drive train systems which, for example, are equipped with an automatic electronic gear change control unit. It is thus possible to dampen the switching shocks in a simple manner which can be achieved only by complex apparatus if the transmission itself is hydraulically or electronically modified. In accordance with the present invention, the transmission is not affected but, rather, the torque derived from the engine is reduced at a critical moment for a predetermined time duration.

Various changes and modifications may be made, and features described in connection with any one of the embodiments may be used with any of the others, within the scope of the inventive concept.

I claim:

1. In combination with a drive train system having an internal combustion (IC) engine (1) and an automatic transmission (2) coupled to the engine, means to reduce the switching shock upon gear change of the transmission comprising means (18) generating up-shift and down-shift gear change control signals;

fuel supply control means (6) inlcuding timing means (60) responsive to a gear change control signal and connected to and controlling the fuel supply to the engine to inhibit fuel supply to the engine for a predetermined time interval upon sensing a gear change control signal and providing a fuel supply inhibit signal when fuel supply is to be inhibited;

time delay means (62) connected to the fuel supply control means (6), said delay means being controlled by the gear change control signals and being effective upon control by a down-shift gear change control signal, but ineffective upon control by an up-shift gear change control signal to delay by a predetermined time interval inhibition of fuel supply upon down-shifting permit a speed increase of the engine just prior to engagement of a down-shift gear of the transmission to thereby stimulate a double clutching effect;

and wherein the IC engine includes a carburetor an air bypass (21) in the vacuum system of the carburetor, and a controllable valve (23) in the air bypass, connected to and controlled by said inhibit signal to selectively break or hold the vacuum in the carburetor by opening or closing, selectively, said bypass to control the carburetor to be responsive to said inhibit signal to inhibit fuel supply upon sensing said inhibit signal.

2. Switching shock reducing means according to claim 1 wherein said predetermined time interval is in the order of about 100 milliseconds.

* * * * *